United States Patent
Wu et al.

(10) Patent No.: US 11,427,749 B2
(45) Date of Patent: Aug. 30, 2022

(54) WAX DEPOSIT REMOVAL USING AQUEOUS SURFACTANT

(71) Applicant: CONOCOPHILLIPS COMPANY, Houston, TX (US)

(72) Inventors: Yaqin Wu, Houston, TX (US); Ying Xu, Houston, TX (US); David Blumer, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 16/921,100

(22) Filed: Jul. 6, 2020

(65) Prior Publication Data
US 2021/0002540 A1    Jan. 7, 2021

Related U.S. Application Data

(60) Provisional application No. 62/870,762, filed on Jul. 4, 2019.

(51) Int. Cl.
  *C09K 8/524*    (2006.01)
(52) U.S. Cl.
  CPC .................................. *C09K 8/524* (2013.01)
(58) Field of Classification Search
  CPC ........ C09K 8/524; C09K 8/584; C09K 8/602; C09K 8/035; E21B 37/06
  See application file for complete search history.

(56) References Cited

U.S. PATENT DOCUMENTS

| | | | | |
|---|---|---|---|---|
| 2,364,222 A | * | 12/1944 | Davids | C09K 8/524 |
| | | | | 507/263 |
| 3,437,146 A | * | 4/1969 | Everhart | C09K 8/524 |
| | | | | 166/303 |
| 5,374,361 A | | 12/1994 | Chan | |
| 5,458,197 A | | 10/1995 | Chan | |
| 5,830,831 A | | 11/1998 | Chan et al. | |
| 5,874,386 A | | 2/1999 | Chan et al. | |
| 5,996,692 A | | 12/1999 | Chan et al. | |
| 6,000,412 A | | 12/1999 | Chan et al. | |
| 6,112,814 A | | 9/2000 | Chan et al. | |
| 6,130,199 A | | 10/2000 | Chan et al. | |
| 6,234,183 B1 | * | 5/2001 | Chan | C09K 8/524 |
| | | | | 134/22.1 |
| 6,911,417 B2 | | 6/2005 | Chan et al. | |
| 7,514,390 B2 | | 4/2009 | Chan | |
| 7,514,391 B2 | | 4/2009 | Chan | |
| 2007/0295368 A1 | | 12/2007 | Harrison | |
| 2008/0096787 A1 | * | 4/2008 | Cauley | C11D 7/5027 |
| | | | | 510/407 |
| 2013/0020085 A1 | | 1/2013 | Pone et al. | |
| 2017/0260441 A1 | | 9/2017 | Blumer et al. | |
| 2017/0275518 A1 | | 9/2017 | Trabelsi et al. | |
| 2019/0264086 A1 | * | 8/2019 | Coburn | C09K 8/524 |

FOREIGN PATENT DOCUMENTS

WO    1999041342 A1    8/1999

OTHER PUBLICATIONS

Vazquez, Oscar, Mackay, Eric James, Jordan, Myles Martin, and Kenneth S. Sorbie. "Impact of Mutual Solvent Preflushes on Scale Squeeze Treatments: Extended Squeeze Lifetime and Improved Well Clean-up Time." SPE 121857 Paper presented at the 8th European Formation Damage Conference, Scheveningen, The Netherlands, May 2009.
Shuler, P.J. "Mathematical Model for the Scale-Inhibitor Squeeze Process Based on the Langmuir Adsorption Isotherm." SPE 25162 Paper presented at the SPE International Symposium on Oilfield Chemistry, New Orleans, Louisiana, Mar. 1993.
Yuan, Ming Dong, Sorbie, K.S., Todd, A.C., Atkinson, L.M., Riley, Helen, and Stuart Gurden. "The Modelling of Adsorption and Precipitation Scale Inhibitor Squeeze Treatments in North Sea Fields." SPE 25163 Paper presented at the SPE International Symposium on Oilfield Chemistry, New Orleans, Louisiana, Mar. 1993.
Meyers, Kevin O., and Stephen J. Salter. "The Effect of Oil Brine Ratio on Surfactant Adsorption From Microemulsions." SPE 8989 Paper presented at the SPE Annual Technical Conference and Exhibition, Dallas, Texas, Sep. 1980.
Jones, S.C., and K.D. Dreher. "Cosurfactants in Micellar Systems Used for Tertiary Oil Recovery." SPE J. 16 (1976) 161-167.
Powell, Daniel E., Frazer, Lamont C., Dibrell, Benton, Arnold, B.D., and Arnold, J. Ryman,. "Optimization of Scale Inhibitor Squeeze Procedures in a North Slope Oil Field." Paper presented at the CORROSION 96, Denver, Colorado, Mar. 1996.
International Search Report dated Sep. 21, 2020 of International Application No. PCT /US2020/040871, filed Jul. 6, 2020.

* cited by examiner

*Primary Examiner* — Kumar R Bhushan
(74) *Attorney, Agent, or Firm* — Boulware & Valoir

(57) ABSTRACT

A method and system for removing wax deposits from a wellbore and other oil production and processing equipment using a wax removal surfactant having at least 1% alkyl polyglycoside (APG), at least 0.5% ethoxylated alcohol (AE) or alcohol ethoxysulfates (AES), and at least 1% saturated alcohol, and optionally comprising D-Limonene, wherein the wax removal surfactant solution forms a Winsor Type III or Type IV microemulsion with water and wax.

15 Claims, 9 Drawing Sheets

| TRITON GR-5M | DIOCTYL SODIUM SULFOSUCCINATE |
|---|---|
| TRITON X-15 | OCTOXYNOL-1 |
| TRITON X-35 | OCTOXYNOL-3 |
| TRITON X-45 | OCTOXYNOL-5 |
| TRITON X-100 | OCTOXYNOL-9 |
| TRITON X-102 | OCTOXYNOL-13 |
| TRITON X-114 | OCTOXYNOL-8 |
| TRITON X-165, 70% | OCTOXYNOL-16 |
| TRITON X-305, 70% | OCTOXYNOL-30 |
| TRITON X-405, 70% | OCTOXYNOL-40 |
| TRITON X-705, 70% | OCTOXYNOL-70 |

| PRODUCT PROPERTIES | GLUCOPON® LINE | | | | | |
|---|---|---|---|---|---|---|
| | 215 CS UP | 225 DK | 425 N/HH | 600 CS UP | 650 EC |
| C-CHAIN | C8-10 | C8-10 | C8-14 | C12-14 | C8-14 |
| DP (APPROX) | 1,5 | 1,7 | 1,5 | 1,4 | 1,5 |
| APPEARANCE | YELLOWISH, SLIGHTLY CLOUDY LIQUID | BROWNISH LIQUID | YELLOWISH LIQUID | YELLOWISH, SLIGHTLY CLOUDY PASTE | YELLOWISH, SLIGHTLY CLOUDY LIQUID |
| ACTIVE SUBSTANCE [%] | 62 - 65 | 68 - 72 | 48 - 52 | 50 - 53 | 50 - 53 |
| WATER CONTENT [%] | 35 - 38 | 28 - 32 | 48 - 52 | 47 - 50 | 47 - 50 |
| VISCOSITY | 3.000 - 4.000 mPa.s, 20°C | 3.500 - 5.000 mPa.s, 20°C | 300 - 600 mPa.s, 20°C | 2.000 - 4.000 mPa.s, 40°C | 1.500 - 3.000 mPa.s, 20°C |
| pH VALUE | 11.5 - 12.5 (10%) | 6.0 - 9.0 (10%) | 7.0 - 9.5 (20%) | 11.5 - 12.5 (20%) | 11.5 - 12.5 (20%) |
| STORAGE TEMPERATURE [°C] | < 40°C | < 40°C | < 40°C | < 50°C | < 40°C |
| BIODEGRADATION (OECD 301 A-F) | READILY | READILY | READILY | READILY | READILY |
| COMPLIANT WITH EU-DETERGENT REGULATION | ✓ | ✓ | ✓ | ✓ | ✓ |

FIG. 5A

| TOMADOL CC-n SURFACTANT | CARBON CHAIN PRESENT | $RO(CH_2CH_2O)_nH$ |
|---|---|---|
| TOMADOL 91-n SURFACTANT | $C_9/C_{10}/C_{11}$ | R- HYDROPHOBIC PORTION OF MOLECULE OBTAINED FROM A LINEAR ALCOHOL OF CARBON LENGTH CC |
| TOMADOL 1-n SURFACTANT | $C_{11}$ | |
| TOMADOL 23-n SURFACTANT | $C_{12}/C_{13}$ | |
| TOMADOL 25-n SURFACTANT | $C_{12}/C_{13}/C_{14}/C_{15}$ | n- AVERAGE MOLES OF ETHYLENE OXIDE PER MOLE OF ALCOHOL |
| TOMADOL 45-n SURFACTANT | $C_{14}/C_{15}$ | |

FIG. 6A

| PRODUCT | CTFA / INCI NAME |
|---|---|
| TERGITOL NP-30 | NONOXYNOL-30 |
| TERGITOL 15-S-3 | C11-C15 PARETH-3 |
| TERGITOL 15-S-5 | C11-C15 PARETH-5 |
| TERGITOL 15-S-7 | C11-C15 PARETH-7 |
| TERGITOL 15-S-9 | C11-C15 PARETH-9 |
| TERGITOL 15-S-12 | C11-C15 PARETH-12 |
| TERGITOL 15-S-15 | C11-C15 PARETH-15 |
| TERGITOL 15-S-20 | C11-C15 PARETH-20 |
| TERGITOL 15-S-30 | C11-C15 PARETH-30 |
| TERGITOL 15-S-40 | C11-C15 PARETH-40 |
| TERGITOL TMN-3 | ISOLAURETH-3 |
| TERGITOL TMN-6 | ISOLAURETH-6 |
| TERGITOL TMN-10 | ISOLAURETH-10 |
| TERGITOL XD | PPG-24-BUTETH-27 |

FIG. 6B

- Removed wax solidified again in water - bad
- Removed wax stayed in liquid phase in K1 SBG with/without d-Limonene - good

WAX DEPOSIT REMOVAL USING AQUEOUS SURFACTANT

CROSS-REFERENCE TO RELATED APPLICATIONS

This application claims priority to U.S. Ser. No. 62/870,762, filed Jul. 4, 2019 and incorporated by reference in its entirety for all purposes.

FIELD OF THE INVENTION

The invention relates to products, methods and systems for removing wax from wellbores and equipment, such as oil and gas wellbores and equipment used to produce, transport and commercialize hydrocarbons.

BACKGROUND OF THE INVENTION

Almost any heavy organic deposit encountered in oil extraction is referred to as paraffin or wax. While paraffins are usually the major component in these deposits, it is most often actually a mixture of paraffins—primarily straight chain n-alkanes—and asphaltenes, but the deposits often also contain resins, silt, gums, salt crystals, scale, sand and clay. That is why it is important that any solvent used to remove these deposits is effective at removing more than just paraffin. We use the term "wax" herein to describe all such deposits, but it is to be understood that the wax is a complex mixture and that its composition will vary from reservoir to reservoir.

Wax components can precipitate from crude petroleum fluids when the original equilibrium conditions of the reservoir are changed so that the solubility of the waxes is reduced. Thus, wax is typically a bigger problem in colder climates or reservoirs. Wax precipitation does not necessarily lead to deposition, however, because individual wax crystals tend to disperse in the fluid instead of depositing on a surface. The temperature gradient between the equipment wall and bulk oil is the main driver for wax to deposit, but nucleating materials, such as asphaltenes, formation fines, clay, or corrosion products also contribute to agglomeration into larger particles. These larger particles then may separate out of the fluid and form solid deposits. Thus, oil sands and heavy oils may have greater problems with wax deposits. FIG. 1 shows a sample cut through of a pipe highly fouled with wax deposits.

Even without deposition, wax causes problems. Crystals of wax in crude oils lead to non-Newtonian flow characteristics, including very high yield stresses that are dependent on time, and the shear and temperature histories of the fluid. Wax precipitation-induced viscosity increases causes of high flowline pressure drops. In turn, lower flow rates allow further deposition. In extreme cases, pumping pressure can exceed the limits of the system and stop flow entirely.

A related problem is the high-yield stress for restarting flow. When oil is allowed to stand in a pipeline at temperatures below its pour point, a certain pressure is required to break the gel and resume flow. Again, this pressure may be higher than the pressure limits of the pumps and pipelines.

There are a range of methods for removing paraffin wax build-ups in oil wells and equipment, but they can be grouped into three main types by mechanism of action: 1) Mechanical, 2) Thermal and 3) Chemical. Of course, many methods employ combinations of these basic methodologies.

Mechanical—Scrapers and cutters are used extensively to remove wax deposits from tubing because they can be economical and result in minimal formation damage. Scrapers may be attached to wireline units, or they may be attached to sucker rods to remove wax as the well is pumped. Deposits in surface pipelines can be removed by forcing pigs through the lines.

Another method of mechanical intervention that helps prevent deposition is the use of plastic or coated pipe. Low-friction surfaces make it more difficult for wax crystals to adhere to the pipe walls. Deposition will still occur if conditions are highly favorable for wax precipitation, and deposits will grow at the same rate as for other pipes once an initial layer of material has been laid down; therefore, the pipe and coating system must be capable of withstanding one of the other methods of wax removal.

Thermal—Because wax precipitation is highly temperature dependent, thermal methods can be highly effective for both preventing and removing wax. Prevention methods include steam- and electrical-heat tracing of flowlines in conjunction with thermal insulation. Thermal methods for removing wax depositions include hot oiling and hot watering. Hot water treatments do not provide the solvency effects that hot oiling can, so surfactants are often added to aid in dispersion of wax in the water phase, but surfactants are discussed under chemical methods.

Hot oiling is one of the most popular methods of deposited wax removal. Wax is melted and dissolved by hot oil, which allows it to be circulated from the well and the surface producing system. Hot oil is normally pumped down the casing and up the tubing; however, in non-flowing wells, the oil may be circulated down the tubing and up the casing. There is evidence that hot oiling can cause permeability damage if melted wax enters the formation.

Higher molecular-weight waxes tend to deposit at the high-temperature bottom end of the well. Lower molecular-weight fractions deposit as the temperature decreases up the wellbore. The upper parts of the well receive the most heat during hot oiling. As the oil proceeds down the well, its temperature decreases and the carrying capacity for wax is diminished. Thus, sufficient oil must be used to dissolve and melt the wax at the necessary depths.

Unfortunately, any heat-based method tends to be somewhat less effective in colder climates. As the hot fluids inevitable cool, the wax can once again recrystallize and again form deposits. Thus, thermal methods are often combined with other methods to improve efficacy.

Chemical—The types of chemicals available for paraffin treatment include solvents, wax crystal modifiers, dispersants and surfactants.

Solvents can be used to treat deposition in production strings and also may be applied to remediate formation damage. Solvents are mostly used in large batch treatments. Although chlorinated hydrocarbons are excellent solvents for waxes, they generally are not used because of safety and processing difficulties they create in the produced fluid. Hydrocarbon fluids consisting primarily of normal alkanes such as condensate and diesel oil can be used, provided the deposits have low asphaltene content. Aromatic solvents such as toluene and xylene are good solvents for both waxes and asphaltenes.

Wax crystal modifiers act at the molecular level to reduce the tendency of wax molecules to network and form lattice structures within the oil. Wax crystal modifiers that act to reduce oil viscosity and lower the wax gel strength are only effective when used continuously. Since they work at the molecular level, they are effective in concentrations of parts per million, as opposed to hot oil or solvents, which must be applied in large volumes. However, wax crystal modifiers have a high-molecular-weight and as a result they have high pour points, so their use may be limited in cold climates.

Dispersants are a type of surfactant that helps disperse the wax crystals into the produced oil or water. This dispersing of the wax crystals into the produced oil or water helps prevent deposition of the wax and also has a positive effect on viscosity and gel strength. Dispersants can help break up deposited wax into particles small enough to be carried in the oil stream. To prevent wax deposition, dispersants must be used continuously, but to remediate deposited wax, dispersants can be used either continuously or in batch treatments. One advantage is that dispersants generally have a very low pour point making their use suitable for cold climates. These chemicals are used in low concentrations and can be formulated in both aqueous and hydrocarbon solutions, making them relatively safe and inexpensive.

Surfactants are a general class of chemicals that are most often used to clean vessels, tanks, pipes, machinery or any place where wax may deposit. Surfactants or dispersants can also be used in combination with hot oil and water treatments.

Before choosing a chemical to remove paraffin deposits it is important to first consider the nature of wax build-ups. Oil wells that suffer from wax problems are, in fact, usually experiencing other type of fouling as well.

Many chemical treatments for paraffin in use today require heat in order to be most effective. The application of heat into the system requires additional equipment, energy usage and expense so it is preferable to choose chemicals that are effective at lesser temperatures.

The final and most important consideration when selecting the best paraffin removal chemical is safety. Many chemical treatments require the use of caustic reagents that are hazardous to workers and can damage equipment. Many solvent-based treatments contain toxic chemicals that increase risks to human health and the environment.

Thus, what is needed in the art are better methods of wax removal, particularly methods that are safer for employees, less toxic to the environment, and yet have good efficacy at colder temperatures.

SUMMARY OF THE INVENTION

SCHMOO-B-GONE SURFACTANT® ("SBG") is a commercially available dispersing surfactant composition in an alkaline base used to emulsify hydrocarbons. SBG is not a single recipe, but a collection or class of surfactants that contain alkyl polyglycoside (e.g. 4-20%), linear primary ethoxylated alcohol (e.g. >0-15%), sodium hydroxide (NaOH) (e.g. 1-30%), and may contain a mixture of alcohols (e.g. 0-25%). A variety of combinations of composition components of SBG-like surfactants are conceivable. SBG-like recipes and uses are described in several patents: U.S. Pat. Nos. 5,374,361, 5,458,197, 830,831, 5,874,386, 5,996,692, 6,000,412, 6,090,754, 6,112,814, 6,130,199, 6,234,183, 6,911,417, 7,514,390, 7,514,391, each of which is incorporated by reference in its entirety for all purposes.

The surfactant in SBG tends to form microemulsions. Microemulsions are clear, thermodynamically stable, isotropic liquid mixtures of oil, water and surfactant, frequently in combination with a cosurfactant. The aqueous phase may contain salt(s) and/or other ingredients, and the "oil" may actually be a complex mixture of different hydrocarbons and olefins. In contrast to ordinary emulsions, microemulsions form upon simple mixing of the components and do not require the high shear conditions generally used in the formation of ordinary emulsions. The three basic types of microemulsions are direct (oil dispersed in water, o/w), reversed (water dispersed in oil, w/o) and bicontinuous.

We have now discovered that SBG-like surfactants can be used to dissolve wax deposits in crude oil equipment—a novel use for these and similar compositions. The formation of micro-emulsions by SBG is believed to provide the driving force for this surfactant mixture to break the structure of the wax deposits. Our lab tests indicate that this composition performs significantly better than hot water treatment alone. The optional addition of D-limonene provides increased solvency for the n-paraffins, further breaking the structure of the deposits and enhancing the effectiveness of aqueous SBG. The combination is remarkably effective in removing wax deposits, keeping the removed wax dispersed, and preventing the removed wax from redepositing.

Thus, the invention generally relates to methods of wax removal using an aqueous wax removal surfactant comprising alkyl polyglycoside (e.g. 1-20%), ethoxylated alcohol (e.g. >0-15%), sodium hydroxide (NaOH) (e.g. 1-30%), an optional mixture of alcohols (e.g. 0-25% or 1-25%) and preferably also containing about 2-50% D-limonene, most preferred about 15-25%, or about 20%. All percentages herein are weight percentages, unless apparent otherwise.

Surfactants in this class (without the D-limonene) are known, as described above, but are typically used for other purposes and have not previously been optimized for removal of wax deposits. Thus, the prior art compositions may be similar, but were never used for removing wax from wells. Further, since they function for different purposes, their optimization requirements are different. The solutions developed herein are preferably optimized so that they function well to dissolve the particular wax deposits resulting from the crude oils in a given reservoir.

A cosurfactant may be used in conjunction with SBG, which may be a primary surfactant, in a surfactant system of the present disclosure. One cosurfactant that may be used in the surfactant system of the present disclosure may broadly be a hydrocarbon sulfonate surfactant having an equivalent weight from 225 to 600. Examples of hydrocarbon sulfonates include, olefin sulfonates, alkyl sulfonates and petroleum sulfonates, which may be commercially available. Moreover, a cosurfactant that may be utilized in post-primary oil recovery may be a petroleum sulfonate having an average equivalent weight in the range of 325 to 600.

Another cosurfactant that can be used in the surfactant system of this disclosure may be saturated or unsaturated alcohols having 1-15 carbon atoms per molecule, or alcohols of 4-20 carbon atoms per molecule which have been ethoxylated or propoxylated with an average of 1 to about 12 ethylene oxide or propylene oxide units per molecule, or mixtures of two or more of the alcohols described above.

In some embodiments, the cosurfactant may be a saturated alcohol having 3-15 carbon atoms per molecule and may be soluble to an appropriate degree in both water and oil. Examples of saturated alcohols, having 3 to 8 carbon atoms, include n-propanol, n-butanol, isobutyl alcohol, isoamyl alcohol, n-amyl alcohol, n-pentanol, n-hexanol, n-octanol. When an alcohol is to be selected for oil within a particular subterranean formation, the shorter chain alcohols may generally be found suitable for oils containing high molecular weight carboxylic acids, with the longer chain alcohols are more suitable for oils containing lower molecular weight carboxylic acids. These saturated alcohols can be combined with ethoxylated or propoxylated alcohols in the wax removal surfactant.

Other cosurfactants that may be used in the surfactant system of the present disclosure include polar organic compounds, such as primary, secondary, or tertiary amines having 1-12 carbon atoms per molecule, phenol or phenols having a side chain of 1-10 carbon atoms per molecule, ketones having 3-12 carbon atoms per molecule, mercaptans having 2-12 carbon atoms per molecule, glycols having 2-18 carbon atoms per molecule, glycerol or glycerol esters, aldehydes having 2-12 carbon atoms per molecule, amides having 1-8 carbon atoms per molecule, nitriles having 2-8 carbon atoms per molecule, and sulfoxides or sulfone having 2-12 carbon atoms per molecule. Also, an example cosurfactant may be a phenol, amine, mercaptan, glycol, or amide of 1-20 carbon atoms per molecule which have been ethoxylated or propoxylated with an average of 1-12 ethylene oxide or propylene oxide units per molecule.

The invention generally includes any one or more of the following embodiments, in any combination(s) thereof:

A method of removing wax deposits from oil production or processing equipment (OPPE) comprising first determining that efficiency is reduced in OPPE as a result of wax deposits; then adding a wax removal surfactant of at least 50° C. into the OPPE in an amount sufficient to dissolve the wax deposits, wherein the wax removal surfactant comprises an aqueous solution having at least 1% alkyl polyglycoside (APG), at least 0.5% ethoxylated alcohol (AE) or alcohol ethoxysulfates (AES), and at least 1% saturated alcohol, wherein the wax removal surfactant solution forms a Winsor Type III or Type IV microemulsion with water and wax; and finally recovering the wax removal surfactant plus dissolved wax deposits, thus leaving the OPPE with reduced or no wax deposits.

A method of removing wax deposits from crude oil equipment comprising obtaining a sample of a wax deposit in an OPPE; testing the sample to optimize a wax removal surfactant for dissolving the sample, wherein the wax removal surfactant has a temperature of at least 50° C. and comprises an aqueous solution having at least 1% alkyl polyglycoside (APG), at least 0.5% ethoxylated alcohol (AE) or alcohol ethoxysulfates (AES), and at least 1% saturated alcohol, wherein the wax removal surfactant forms a Winsor Type III or Type IV microemulsion with water and wax; adding the optimized wax removal surfactant having a temperature of at least 50° C. into the OPPE in an amount sufficient to dissolve the wax deposits; and recovering the wax removal surfactant plus dissolved wax deposits, thus leaving the OPPE with reduced or no wax deposits.

Any method herein, wherein the wax removal surfactant has a temperature of at least 50° C., 60° C., 70° C., 80° C., or 90° C. Lower temperatures are preferred due to reduced energy requirements, but increased temperature may be need in colder climates or very long/deep wells or pipes.

Any method herein, wherein the wax removal surfactant further comprises D-limonene; again, lesser amounts are preferred due to cost considerations. Amounts of D-limonene ranging from 2-50% or 5-25% are contemplated, but preferably <25%, <20%, <15% or <10% are used.

Any method herein, wherein the APG are C8-C16, the EA or AES are C8-C15 with an average of about 2-14 ethylene oxide groups, and the saturated alcohols are C3-C15.

Any method herein, wherein the alkyl polyglycosides are C10-C14 alkyl polyglucosides, the EA or AES are C9-C15 with an average of about 12 ethylene oxide groups, and the saturated alcohols are C3-C8.

Any method herein, the wax removal surfactant comprising:
  11-5% GLUCOPON® 600 CSUP, 1-5% TOMADOL® 91-2.5, 0.1-2% TOMADOL® 25-12, 0.1-2% n-hexanol, 0.1-2% n-octanol; or
  1-5% TRITON® CG-600, 1-5% TERGITOL® 15-S-3, 0.1-2% n-butanol, and 0.1-2% n-hexanol; or
  1-5% GLUCOPON® 600 CSUP, 1-5% TOMADOL® 91-4, 0.1-4%, n-propanol, 0.1-2% n-pentanol, and 1-5% NaOH; or
  1-5% GLUCOPON® 600 CSUP, 1-5% TOMADOL® 91-2.5, 0.1-2% TOMADOL® 91-6, 0.1-2% n-propanol, 0.1-2% n-pentanol, NaOH 1-5%, and 0.1-3% TEGMBE (triethylene glycol monobutyl ether); or
  1-5% GLUCOPON® 600 CSUP, 1-5% TOMADOL® 91-2.5, 0.1-2% TOMADOL® 91-6, 0.1-2% n-butanol, 0.1-2% n-hexanol, and 1-5% NaOH.

Any method herein, wherein the wax removal surfactant further comprising wax dispersants, wax solvents, wax crystal modifiers, or combinations thereof.

Any method herein, wherein the optimized wax removal surfactant is left to soak the OPPE for a period of at least 1 hour, or at least 2 hours, or at least 5 hours, or at least 8 hours, or at least 12 hours, or at least 24 hours.

Any method herein, wherein the optimized wax removal surfactant is circulated though the OPPE for a period of at least 1 hour, or at least 2 hours, or at least 5 hours, or at least 8 hours, or at least 12 hours, or at least 24 hours.

Any method herein, wherein the method is repeated at periodic intervals to keep wax deposits at a minimum.

Any method herein, wherein the OPPE is an oil well, and wherein the well is shut-in after the adding step for a period of at least 1 hour, or at least 2 hours, or at least 5 hours, or at least 8 hours, or at least 12 hours or 24 hours.

Also preferred, the well is opened after the period, and the initial flow back is sent to a truck or tank for disposal or reuse until no optimized wax removal surfactant is in the flow back. Thereafter, the flow back is routed to a central processing facility ("CPF") for producing oil. Any of the wax or surfactant ingredients can be separated from any oil in the initial flow back and the surfactants potentially re-used and oil and wax sold or used in further processing.

As used herein, "providing" is intended to include use of existing equipment, as well as the provision of new equipment. Thus, providing a producing well can include using an existing well.

As used herein, "oil production and processing equipment" or "OPPE" includes wellbores, downhole equipment, separator tanks, pipelines, pumps, valves, and the like, that are used in the production, transport and processing of crude oils.

As used herein, "wax deposits" refers to the complex deposited mixture of wax, asphaltenes and other ingredients that form in crude oil production and processing equipment. The composition of wax deposits will vary in each reservoir, and for best results the wax removal surfactant should be optimized for use. This can easily be done by obtaining a sample of a wax deposit from surface or downhole equipment, and performing bench top tests, as described herein. It is also beneficial to determine the chemical content of the wax deposits before such tests, as the accumulated information can be helpfully applied to other reservoirs with similar wax compositions, eventually reducing the need for separate optimization tests in each reservoir.

By determining "chemical content", we generally mean determining the identity and concentration of all components in a wax.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise," "have," and "include" (and their variants) are open-ended linking verbs and allow the addition of other elements when used in a claim. The phrase "consisting of" excludes other elements. The term "consisting essentially of" occupies a middle ground, allowing the inclusion of nonmaterial elements, such as buffers, varying salts, and the like, that do not materially change the novel features or combination of the invention.

The following abbreviations are used herein:

| | |
|---|---|
| AES | Alcohol ethoxysulfates |
| APG | Alkylpolyglycoside |
| BPD | Barrels per day (aka BOPD, bbl/d, bpd, bd, or b/d) |
| CPF | Central processing facility |
| CSOR | Cumulative steam to oil ratio |
| EA | Ethoxylated alcohol |
| IFT | Interfacial tension |
| OPPE | oil production and processing equipment |
| SBG | Schmoo-B-Gone |
| TDS | Total dissolved solids |
| TOC | Total organic carbon |

BRIEF DESCRIPTION OF THE DRAWINGS

The invention, together with further advantages thereof, may best be understood by reference to the following description taken in conjunction with the accompanying drawings in which:

FIG. 5A shows some exemplary GLUCOPONS®.

FIG. 6A shows some exemplary TOMADOLS®.

FIG. 6B shows some exemplary TERGITOLS®.

DETAILED DESCRIPTION OF THE INVENTION

Reference will now be made in detail to embodiments of the present invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used in another embodiment to yield a still further embodiment. Thus, it is intended that the present invention cover such modifications and variations that come within the scope of the appended claims and their equivalents.

Figure 1:
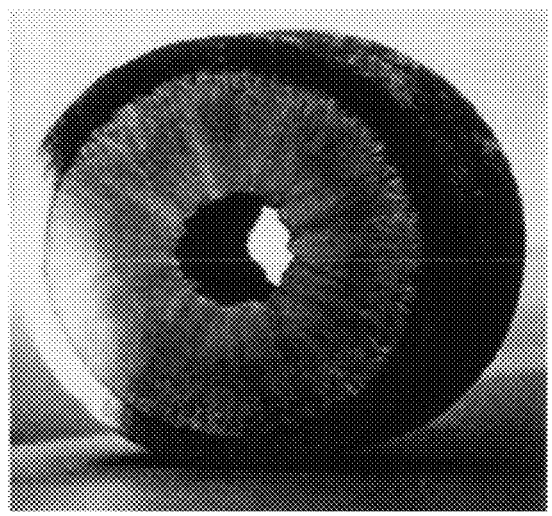
FIG. 1 is a section of tubing showing wax buildup reducing effective diameter in a retrieved pipeline.

FIG. 1 shows a cross section of pipe with large waxy deposits that greatly impede efficiency. The methods and compositions described herein are used to reduce or remove such wax deposits. One embodiment of the presently disclosed method is shown in FIGS. 2A-B.

Figure 2A:
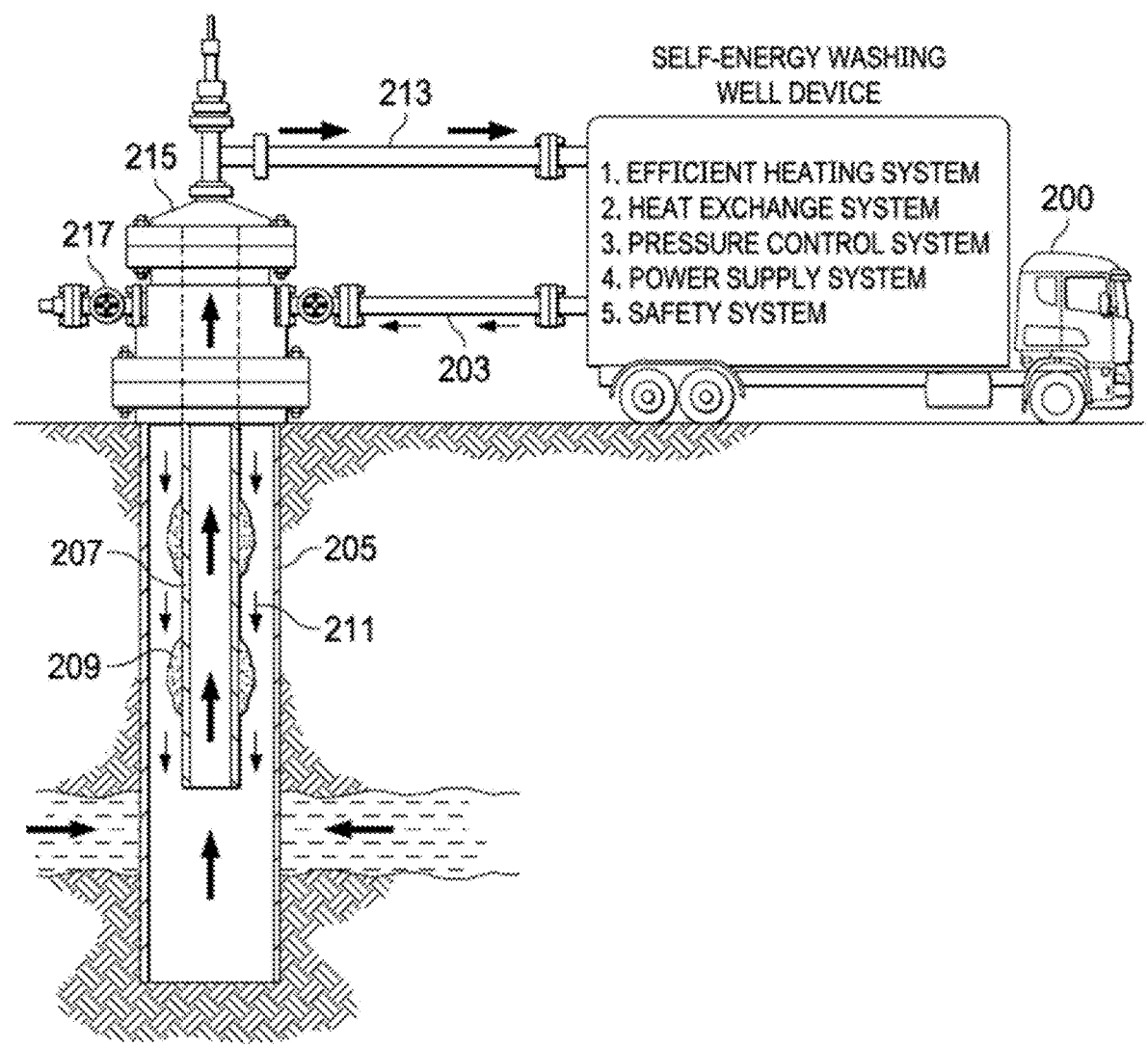
FIGS. 2A and 2B show one example of a method of the invention, but other equipment could be used.

FIG. 2A shows a well with some amount of wax 209 impeding efficiency (here shown in the annulus, but can be throughout the system). The wax is sampled, and then a wax removal surfactant as described herein is preferably optimized for that particular deposit. In preferred methods, the chemical content and melting temperature of the wax is first determined, by any means available in the art, and this data is collected for use in optimizing future wax removal surfactants. Optimization of the surfactant is performed by a variety of bench tests, some of which are described herein, or by reference to a database of pre-collected data of the type described herein.

Figure 2B:
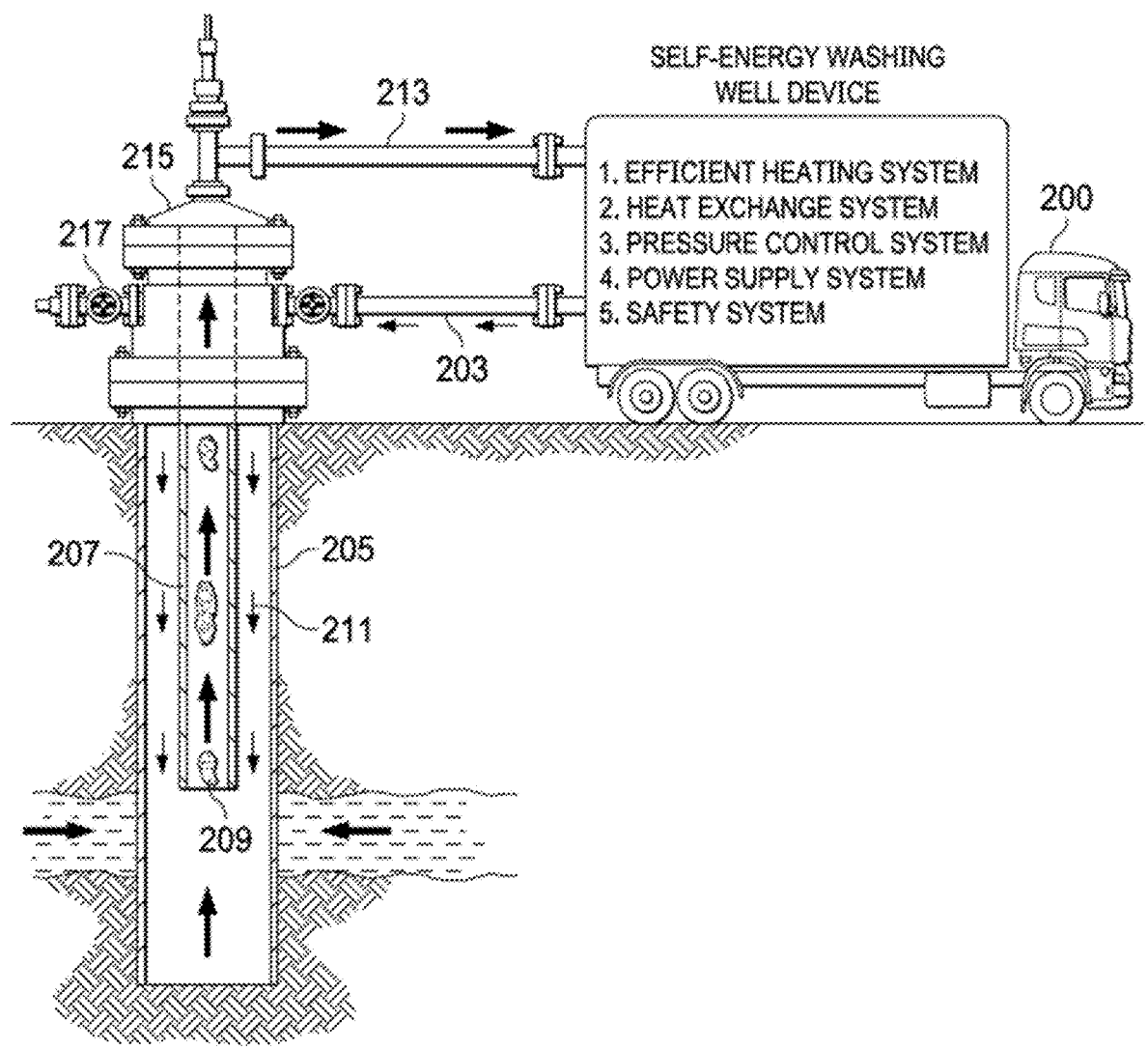

In FIG. 2B, a truck 200 has pulled up to the well and the optimized wax removal surfactant 211 is injected into the well via inline 203. Surfactant 211 travels down the annular space between the inner production tubing 207 and casing 205, dissolving wax 209, and back into truck 200 via outline 213. The flow could also be reversed and can be continuous or the solution left to soak while the well is shut-in. Here shown is a surface pump 215, plus valves 217, but a bottomhole or electronic submersible pump could also be used. The truck is merely exemplary, and other equipment could be used, e.g., onsite or nearby storage tanks, pipelines, and the like. If desired, wax and solids can be removed from the used wax removal surfactant, e.g., by skimming a cooled solution, and the surfactant reused one or more times. Heat will also help the surfactant performance, and the optimized wax removal surfactant 211 should be at least warmed to 50-60° C., but higher or lower temperatures can be used, depending on wax characteristics, climate and energy costs.

Figure 3A:
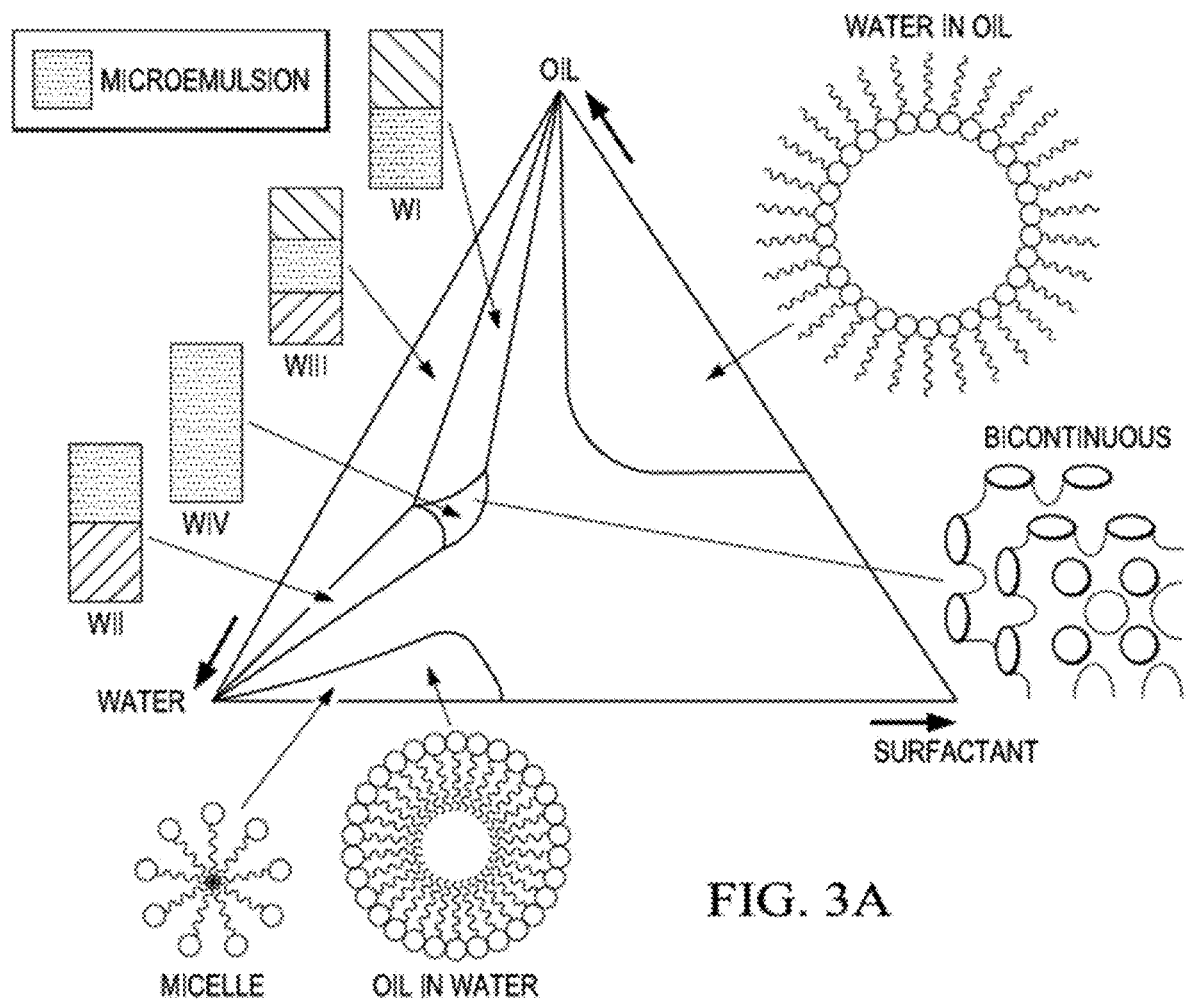
FIG. 3A shows a hypothetical ternary phase diagram representing three components of the system comprising oil water and surfactant wherein oil-in-water emulsion, water-in-oil emulsions and microemulsions are shown. The Winsor microemulsions (WI-WIV) are also shown.
Figure 3B:
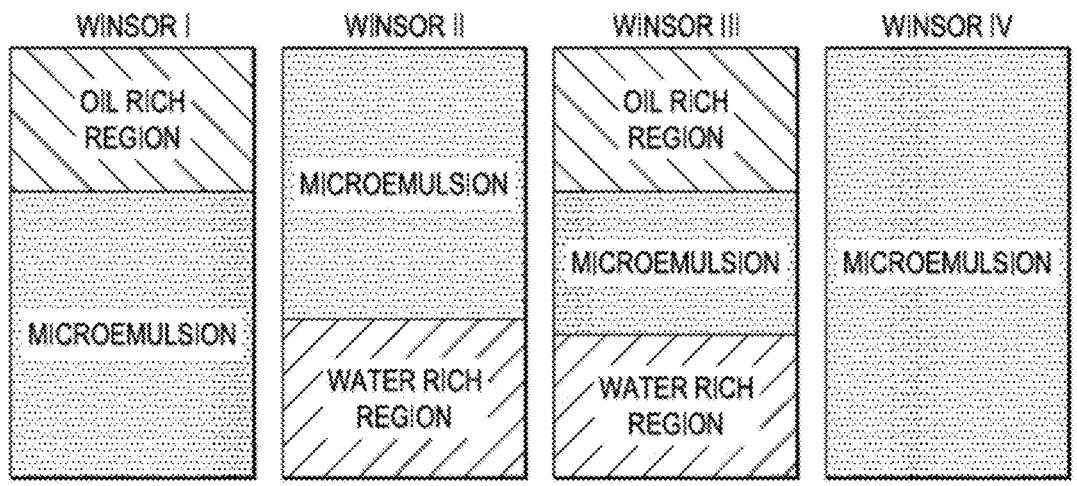
FIG. 3B shows the Winsor Type I-IV microemulsions.

The wax removal surfactant 211 is expected to form an emulsion with the water and wax. In addition to the well-known oil-in-water emulsion and water-in-oil emulsions there is a wide range of emulsifying behavior, including the microemulsions. See e.g., FIG. 3A. A well-known classification of microemulsions is that of Winsor who identified four general types of phase equilibria shown in FIG. 3B:

Type I: the surfactant is preferentially soluble in water and oil-in-water (o/w) microemulsions form (Winsor I). The surfactant-rich water phase coexists with the oil phase where surfactant is only present as monomers at small concentration.

Type II: the surfactant is mainly in the oil phase and water-in-oil (w/o) microemulsions form. The surfactant-rich oil phase coexists with the surfactant-poor aqueous phase (Winsor II).

Type III: a three-phase system where a surfactant-rich middle-phase coexists with both excess water and oil surfactant-poor phases (Winsor III or middle-phase microemulsion).

Type IV: a single-phase (isotropic) micellar solution, that forms upon addition of a sufficient quantity of amphiphile (surfactant plus alcohol).

In the present methods, the wax removal surfactant solution may form a Winsor Type III or Type IV microemulsion with water and wax.

Some exemplary recipes of the wax removal surfactant, each made in water or brine, are as follows:

Wax Removal Surfactant 1:
GLUCOPON 600 UP (an APG): 2.51%; TOMADOL 91-2.5 (an EA): 1.09% and TOMADOL 25-12 (an EA): 0.12%; n-hexanol: 1.00%; and n-octanol: 1.00%.

Wax Removal Surfactant 2:
GLUCOPON 600 UP: 2.51%; TOMADOL 91-2.5: 1.21%; n-butanol: 1.50%; n-hexanol: 0.50%.

Wax Removal Surfactant 3:
GLUCOPON 600 UP: 3%; TOMADOL 91-2.5: 1%; n-butanol: 2%; n-hexanol: 1%.

Wax Removal Surfactant 4:
TRITON CG-600: 2%; TERGITOL® 15-S-3 Surfactant (an EA): 2%; n-butanol: 0.5%; n-hexanol: 0.5%.

Wax Removal Surfactant 5:
GLUCOPON 600 UP (APG): 2.5%; TOMADOL 91-2.5: 1.1%; TOMADOL 25-12: 0.1%; n-hexanol: 1.0%; n-octanol: 1.0%.

Any of these may be combined with 2-50% D-limonene, preferably about 10-25% or about 20%.

APGs are a class of non-ionic surfactants widely used in a variety of household and industrial applications. They are derived from sugars and fatty alcohols; therefore, they are generally favored for their manufacture from renewable resources. The raw materials for industrial manufacture are typically starch and fat, and the final products are typically complex mixtures of compounds with different sugars comprising the hydrophilic end and alkyl groups of variable length comprising the hydrophobic end. When derived from glucose, they are known as alkyl polyglucosides.

Figures 4, 5B:
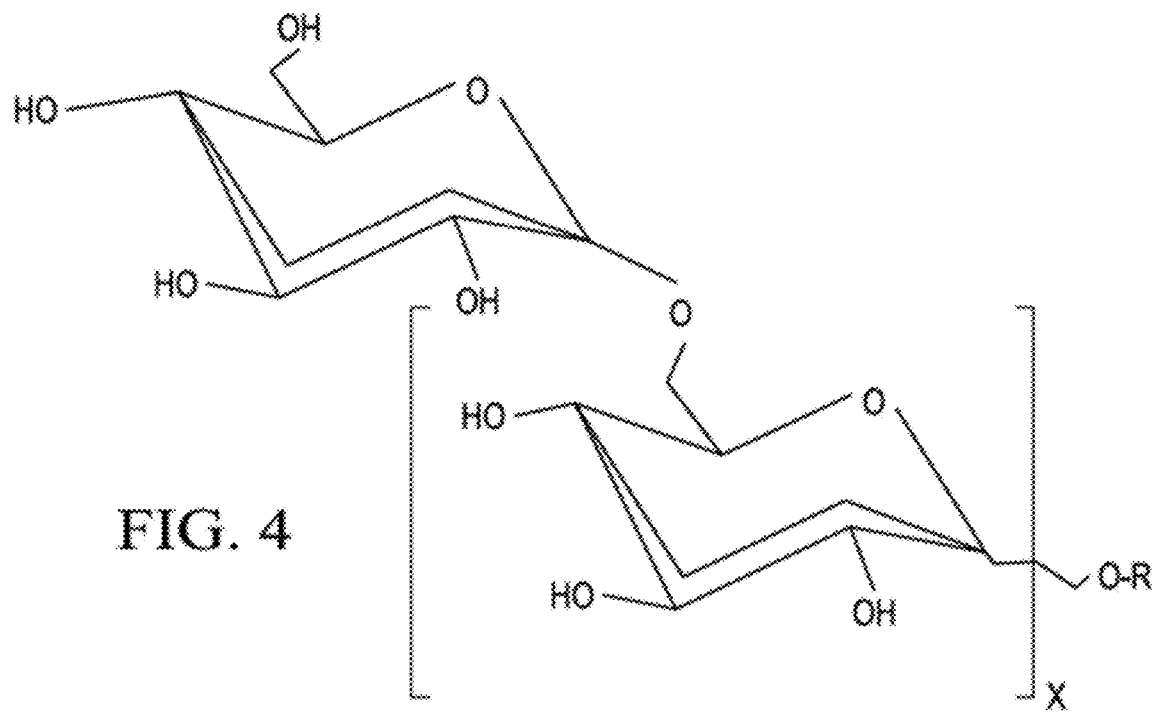
FIG. 4 shows the basic structure of an alkyl polyglucoside.
FIG. 5B shows some exemplary TRITONS®.

GLUCOPON® and TRITON® are two groups of alkyl polyglucosides. FIG. 4 shows the basic structure of an alkyl polyglucoside. A variety of alkyl polyglucosides are available from e.g., BASF® or COGNIS® including GLUCOPON® 215 UP; GLUCOPON® 225 DK; GLUCOPON® 425 N/HH; GLUCOPON® 50 G; GLUCOPON® 600 UP (C10-C16 preservative free. 50-53% active. Lauryl/myristyl glucoside) and GLUCOPON® 650 EC (C8-C16 preservative free. 50-53% active. Alkyl polyglucoside); Glucopon® 600 CSUP (C10-16). Some of the properties of similar surfactants available from COGNIS® are shown in FIG. 5A, some TRITONS are shown in FIG. 5B.

Alcohol ethoxylates (AE) and alcohol ethoxysulfates (AES) are non-ionic surfactants found in products such as laundry detergents, surface cleaners, cosmetics and for use in agriculture, textiles and paint. Carbon chain length is 8-18 while the ethoxylated chain is usually 3 to 12 ethylene oxides long in home products. They feature both a lipophilic tail (R) and a relatively polar head group $((OC_2H_4)_nOH)$, making them ideal for this use. The AES surfactants may be less preferred, due to their sulfur content, but may be acceptable in certain reservoirs, e.g., sweeter reservoirs.

The TOMADOLs® are nonionic surfactants based on ethoxylated alcohols, and are available e.g., from AIR PRODUCTS® or TOMAH PRODUCTS®. The TOMADOLs® are named in the general format TOMADOL® CC-n surfactant, where CC represents the number of carbon atoms present in the alkyl group (R) of the linear alcohol, and n indicates the average moles of ethylene oxide. See e.g., FIG. 6.

TERGITOLs® are another nonionic surfactant based on a mixture of linear secondary alcohols reacted with ethylene oxide, and are available from many suppliers, including DOW® and SIGMA-ALDRICH®. The general formula is $C_{11-15}H_{23-31}O[CH_2CH_2O]xH$. TERGITOL® 15-S-3 for example, is a clear liquid, nonionic surfactant that is oil soluble.

Preferred APG are C8-C16 or C10-C14.

Preferred EA or AES are C8-C15 carbon chain length alkyl groups with an average of about 10-14 and/or 2-8 ethylene oxide or ethoxysulfate groups.

In addition to the APGs, EAs, and AESs, the wax removal surfactant may also contain at least one saturated alcohol. Preferred saturated alcohols are C3-C15 or C6-C15 or C3-C8. Examples of the saturated alcohols include, but are not limited to, n-propanol, n-butanol, isobutyl alcohol, isoamyl alcohol, n-pentanol, n-amyl alcohol, n-hexanol, n-octanol.

In order to provide proof of concept for the invention, we performed benchtop tests using several different recipes of surfactant. We prepared a waxy condensate and performed a cold finger test for 16 hours to allow wax to deposit on the chilled finger. The wax was simple paraffins, lacking asphaltene or other components. The finger temperature was kept at 5° C. with internal coolant to keep the wax deposit on the fingers. The weights of the fingers with wax deposits were recorded.

The fingers were then submerged into beakers filled with various SBG-like formulations, as indicated in the Table. Temperature of the SBG fluids in the beaker was maintained at 60° C. during the test. Next, we drained the fingers, weighed them again and determined the mass loss.

TABLE 1

| Samples | |
|---|---|
| Name | Ingredients (wt %) |
| DI H$_2$O | distilled water |
| K1 SBG | 1-5% GLUCOPON ® 600 CSUP, 1-5% TOMADOL ® 91-4, 0.1-4%, n-propanol, 0.1-2% n-pentanol, and 1-5% NaOH. |
| T2 SBG | 1-5% GLUCOPON ® 600 CSUP, 1-5% TOMADOL ® 91-2.5, 0.1-2% TOMADOL ® 91-6, 0.1-2% n-propanol, 0.1-2% n-pentanol, 1-5% NaOH, and 0.1-3% TEGMBE (triethylene glycol monobutyl ether). |
| T3 SBG | 1-5% GLUCOPON ® 600 CSUP, 1-5% TOMADOL ® 91-2.5, 0.1-2% TOMADOL ® 91-6, 0.1-2% n-propanol, 0.1-2% n-pentanol, 1-5% NaOH, and 0.1-3% TEGMBE (triethylene glycol monobutyl ether). |

TABLE 1-continued

Samples

| Name | Ingredients (wt %) |
|---|---|
| T4 SBG | 1-5% GLUCOPON ® 600 CSUP, 1-5% TOMADOL ® 91-2.5, 0.1-2% TOMADOL ® 91-6, 0.1-2% n-propanol, 0.1-2% n-pentanol, 1-5% NaOH, and 0.1-3%TEGMBE (triethylene glycol monobutyl ether). |
| T5 SBG | 1-5% GLUCOPON ® 600 CSUP, 1-5% TOMADOL ® 91-2.5, 0.1-2% TOMADOL ® 91-6, 0.1-2% n-propanol, 0.1-2% n-pentanol, 1-5% NaOH, and 0.1-3% TEGMBE (triethylene glycol monobutyl ether). |
| BB SBG | 1-5% GLUCOPON ® 600 CSUP, 1-5% TOMADOL ® 91-2.5, 0.1-2% TOMADOL ® 91-6, 0.1-2% n-butanol, 0.1-2% n-hexanol, and 1-5% NaOH. |

Figure 7:
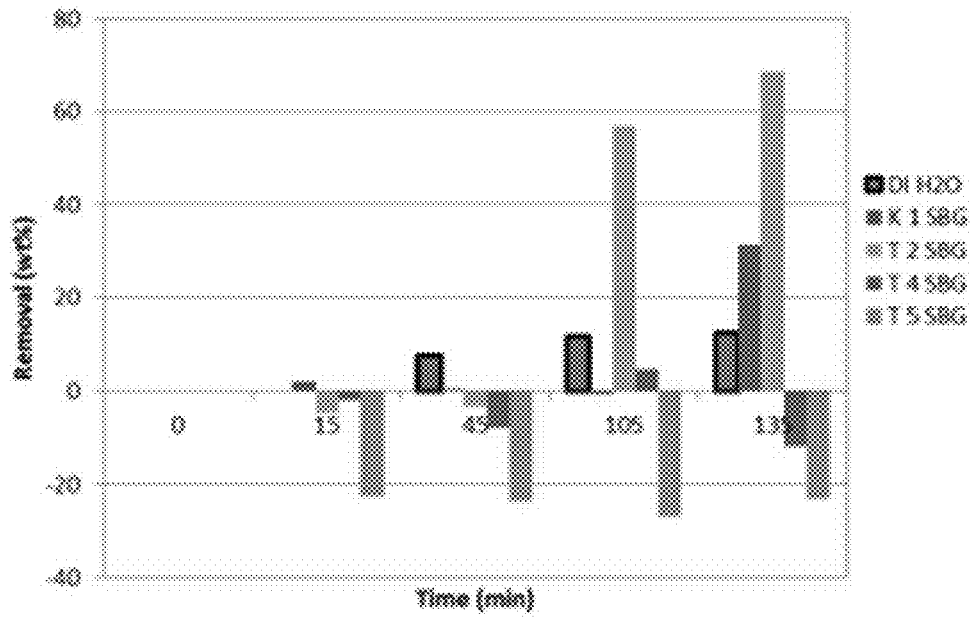
FIG. 7 shows test wax removal data.
Figure 8:
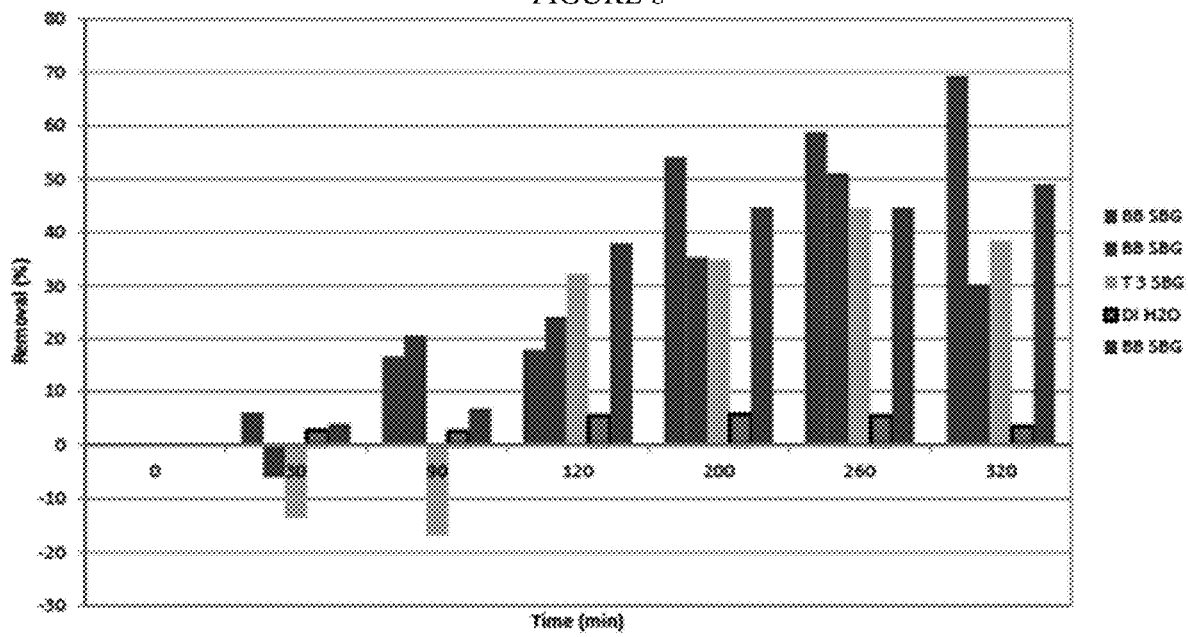
FIG. 8 shows test wax removal data.

The results are shown in FIG. 7 and FIG. 8, which are the same experiment with differing time intervals. K1 and T2 performed better than warmed water, as did BB. T3 began somewhat poorly, but improved with time. The third experiment in FIG. 8 shows 3 sets of BB SBG data to demonstrate repeatability, which was reasonably good.

These data are very promising. First, each of our SBG recipes worked better than a simple hot water process in removing wax. However, given the variation in results, it is still preferred to perform tests to select the optimal SBGs for specific wax samples. Second, SBG contact time with wax is important and with these man-made wax samples at 60° C. 2 hours contact time was the minimum requirement. Obviously, at higher temperatures, less time would be required, as well as the reverse.

It is noted that some of the negative data arises because the SBG penetrated to the wax structure, but at the given time or because of the nature of the recipe, had not yet broken the wax structure. Given enough time, SGB will break the structure and weight loss will be observed.

Figure 9:
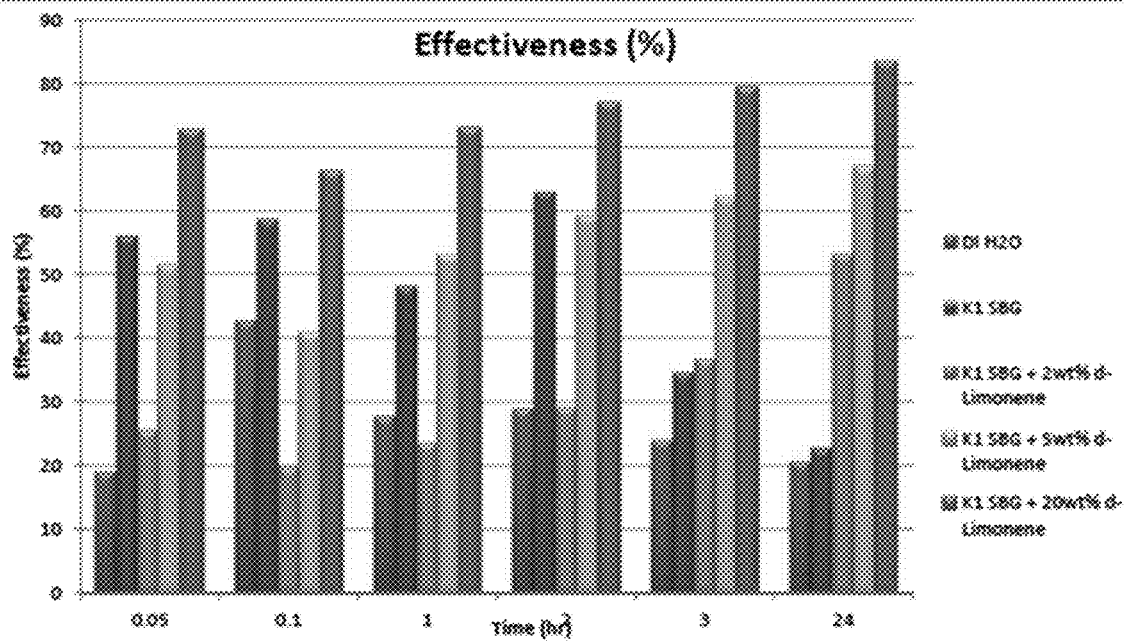
FIG. 9 shows test wax removal data with increasing D-limonene added to the wax removal surfactant.

We then repeated the experiment, but with added D-limonene (2%, 5% and 20%) and the results are shown in FIG. 9. As can be seen, 20% D-limonene greatly improved wax removal.

Figure 10:
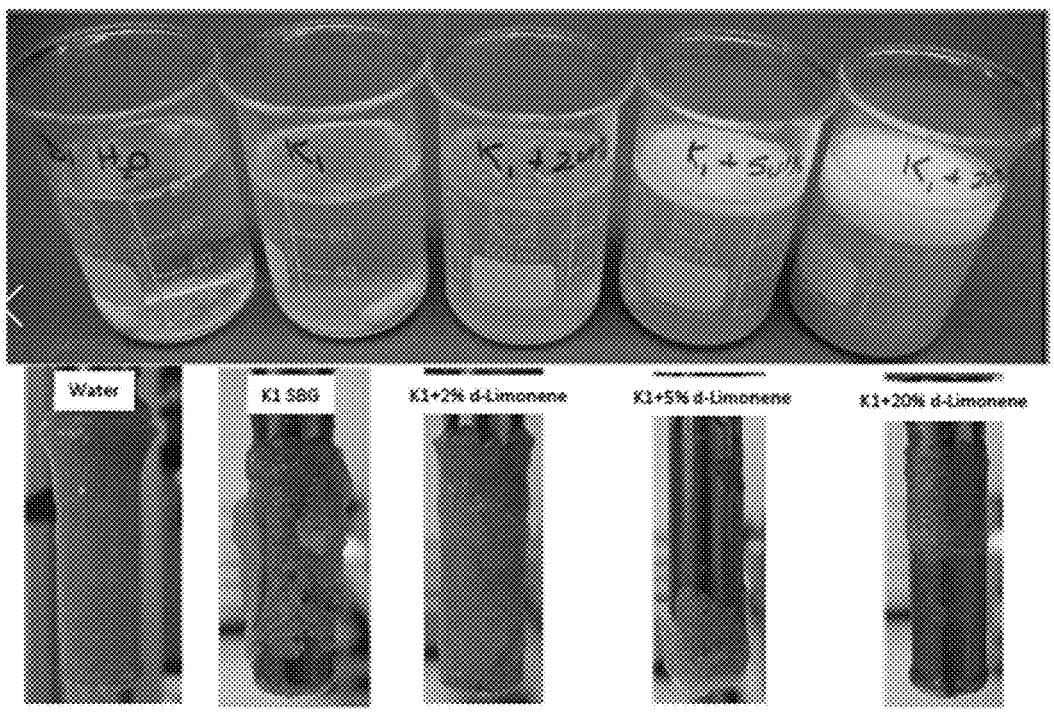
FIG. 10 is a photograph of the cooled beakers and fingers, showing that the D-limonene prevents the wax from re-solidifying as it cools.

Finally, in a third experiment, we allowed the finger to stay submerged in the wax removal surfactant and allowed the entire system to cool to determine the propensity of the wax to re-solidify and the results are shown in FIG. 10. Again, 20% D-limonene prevented most of the wax from re-solidifying and on the finger, and it remains with the surfactant in the beaker.

Some of the data is also presented in Tables 2-4, below:

TABLE 2

Wax Deposits Removal Effectiveness (%) of Hot Water, K1, T2, T4, and T5 SBG

| | Contact Time (min) | | | | |
|---|---|---|---|---|---|
| Type | 0 | 15 | 45 | 105 | 135 |
| DI H$_2$O | 0.00 | 0.00 | 7.74 | 11.73 | 12.41 |
| K1 SBG | 0.00 | 2.00 | 0.44 | −0.69 | 31.54 |
| T2 SBG | 0.00 | −4.51 | −3.18 | 56.76 | 68.65 |
| T4 SBG | 0.00 | −2.08 | −7.87 | 4.70 | −11.93 |
| T5 SBG | 0.00 | −22.51 | −23.48 | −26.86 | −23.19 |

TABLE 3

Wax Deposits Removal Effectiveness (%) of Hot Water, BB and T3 SBG

| | Contact Time (min) | | | | | | |
|---|---|---|---|---|---|---|---|
| Type | 0 | 30 | 90 | 120 | 200 | 260 | 320 |
| BB SBG | 0.00 | 6.04 | 16.53 | 17.90 | 54.05 | 58.74 | 69.26 |
| BB SBG | 0.00 | −6.14 | 20.51 | 24.18 | 35.35 | 50.99 | 30.30 |
| T3 SBG | 0.00 | −13.58 | −16.79 | 32.20 | 34.86 | 44.43 | 38.41 |
| DI H$_2$O | 0.00 | 2.72 | 2.51 | 5.45 | 5.76 | 5.49 | 3.44 |
| BB SBG | 0.00 | 3.91 | 6.78 | 37.92 | 44.71 | 44.60 | 49.06 |

TABLE 4

Wax Deposits Removal Effectiveness (%) of K1 SBG with D-limonene

| | Contact Time (min) | | | | | | |
|---|---|---|---|---|---|---|---|
| Type | 0 | 3 | 6 | 60 | 120 | 180 | 1440 |
| K1 SBG + 20 wt % D-limonene | 0.00 | 72.77 | 66.36 | 73.10 | 77.03 | 79.47 | 83.48 |
| K1 SBG | 0.00 | 56.07 | 58.70 | 48.21 | 63.09 | 34.70 | 22.95 |
| K1 SBG + 2 wt % D-limonene | 0.00 | 25.63 | 19.74 | 23.61 | 29.16 | 36.72 | 53.24 |
| K1 SBG + 5 wt % D-limonene | 0.00 | 51.50 | 40.89 | 53.06 | 59.18 | 62.07 | 67.09 |
| DI H$_2$O | 0.00 | 19.07 | 42.76 | 27.82 | 29.00 | 24.00 | 20.71 |

The invention has several advantages over the prior art. First, there is a safety concern when heating oil, and it is much safer to heat SBG than oil. Second, most of the time the oil used for dewaxing is the original waxy oil that has produced the wax deposition to begin with and thus the solvency provided by the hot oil is limited. Third, SBG is more cost effective comparing to other wax remediation methods such as mechanical or chemical treatments, although the addition of large percentages of D-Limonene may make the solution less economical.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference for all purposes. The discussion of any reference is not an admission that it is prior art to the present invention, especially any reference that may have a publication data after the priority date of this application. Incorporated references are listed here for convenience:

Jones et al., Cosurfactants in micellar systems used for tertiary oil recovery. SPE 5566, June 1976.
Meyers and Salter, The effect of oil/brine ratio on surfactant adsorption from microemulsion. Society of Petroleum Engineers Journal, August 1981, 500-512.
Powell et al. Optimization of scale inhibitor squeeze procedures in a north slope oil field. Corrosion 96, The NACE International Annual Conference and Exposition, Paper No. 185, 1996.
Shuler, P. J. 1993. Mathematical Model for the Scale-Inhibitor Squeeze Process Based on the Langmuir Adsorption Isotherm. Presented at the SPE International Symposium on Oilfield Chemistry, New Orleans, La., 2-5 Mar. 1993. SPE-25162-MS.
SPE: 121857-MS: Vazquez, O., et al., Impact of Mutual Solvent Preflushes on Scale Squeeze Treatments: Extended Squeeze Lifetime and Improved Well Clean-up Time (2009).
Yuan, M. D., Sorbie, K. S., Todd, A. C. et al. 1993. The Modelling of Adsorption and Precipitation Scale Inhibitor Squeeze Treatments in North Sea Fields. Presented at the SPE International Symposium on Oilfield Chemistry, New Orleans, 2-5 March. SPE-25163-MS.
US20130020085 (Pone, Blumer), Surfactant System to Increase Hydrocarbon Recovery.
U.S. Pat. No. 5,374,361, Well Cleanout Using Caustic Alkyl Polyglycoside Compositions.
U.S. Pat. No. 5,458,197, Well Cleanout System and Method.
U.S. Pat. No. 5,830,831, Surfactant Compositions for Wellbore Operations, Method of Forming Same and Method of Using Same.
U.S. Pat. No. 5,874,386, Method for Cleaning Drilling Fluids Solids from a Wellbore Using a Surfactant Composition.
U.S. Pat. No. 5,996,692, Surfactant Composition and Method for Cleaning Wellbore and Oilfield Surfaces Using the Surfactant Composition.
U.S. Pat. No. 6,000,412, Method for Cleaning Deposits from a Tank Using a Surfactant Composition.
U.S. Pat. No. 6,090,754, Surfactant Blends for Well Operations.
U.S. Pat. No. 6,112,814, Method For Cleaning Wellbore Surfaces Using Coiled Tubing with a Surfactant Composition.
U.S. Pat. No. 6,130,199, Surfactant Composition and Method for Cleaning Wellbore and Oilfield Surfaces Using the Surfactant Composition.
U.S. Pat. No. 6,234,183, Method for Removing Deposits Comprising Heavy Hydrocarbonaceous Materials and Finely Divided Inorganic Materials from a Flow Line Using a Surfactant Composition.
U.S. Pat. No. 6,911,417, Water Block Removal with Diesel Based Surfactants.
U.S. Pat. No. 7,514,390, Method for Removing Filter Cake From a Horizontal Wellbore Using Acid Foam.
U.S. Pat. No. 7,514,391, Method and Composition for Removing Filter Cake from a Horizontal Wellbore Using a Stable Acid Foam.
US20170260441, Preflush Chemicals for Scale Inhibitor Squeeze.

The invention claimed is:

1. A method of removing wax deposits from oil production or processing equipment (OPPE), said method comprising:
   a. determining that efficiency is reduced in OPPE as a result of wax deposits;
   b. adding a wax removal surfactant having a temperature of at least 50° C. into said OPPE in an amount sufficient to dissolve said wax deposits, said wax removal surfactant consisting essentially of an aqueous solution having at least 1% alkyl polyglycoside (APG), at least 0.5% ethoxylated alcohol (AE) or alcohol ethoxysulfates (AES), at least 1% linear alcohol, and about 20% D-limonene, wherein said wax removal surfactant solution forms a microemulsion with water and wax and/or oil; and
   c. recovering or removing said wax removal surfactant plus dissolved wax deposits, thus leaving said OPPE with reduced or no wax deposits,
      wherein said wax removal surfactant with about 20% D-limonene removes more wax and prevents more wax re-solidification on cooling than a control wax removal surfactant with 0%, 2% or 5% D-limonene.

2. The method of claim 1, wherein said wax removal surfactant is used at ≥60°.

3. The method of claim 1, wherein said APG are C8-C16, said AE or AES are C8-C15 with an average of about 2-14 ethylene oxide groups, and said alcohols are about C4-C15.

4. The method of claim 1, wherein said APG are C10-C14 alkyl polyglucosides, said ethoxylated alcohols are C9-C15 with an average of about 12 ethylene oxide groups, and said alcohols are about C6-C12.

5. The method of claim 1, wherein said wax removal surfactant further comprises wax dispersants, wax solvents, wax crystal modifiers, or combinations thereof.

6. A method of removing wax deposits from crude oil production and processing equipment (OPPE), said method comprising:
   a. obtaining a sample of a wax deposit in an OPPE;
   b. testing said sample to optimize a wax removal surfactant for dissolving said sample, said wax removal surfactant being used at a temperature of at least 50° C. and consisting essentially of an aqueous solution having at least 1% alkyl polyglycoside (APG), at least 0.5% ethoxylated alcohol (AE) or alcohol ethoxysulfates (AES), at least 1% linear alcohol, and about 20% D-limonene, wherein said wax removal surfactant solution forms a Winsor Type III or Type IV microemulsion with water and wax;
   c. adding said optimized wax removal surfactant having a temperature of least 50° C. into said OPPE in an amount sufficient to dissolve said wax deposits; and
   d. recovering or removing said wax removal surfactant plus dissolved wax deposits, thus leaving said OPPE with reduced or no wax deposits,
      wherein said wax removal surfactant with about 20% D-limonene removes more wax and prevents more wax re-solidification on cooling than a control wax removal surfactant with 0%, 2%, or 5% D-limonene.

7. The method of claim 6, wherein said optimized wax removal surfactant is used at a temperature of at least 60° C.

8. The method of claim 6, wherein said APG are C8-C16, said AE or AES are C8-C15 with an average of about 2-14 ethylene oxide groups, and said alcohols are about C4-C15.

9. The method of claim 7, wherein said APG are C10-C14 alkyl polyglucosides, said ethoxylated alcohols are C9-C15 with an average of about 12 ethylene oxide groups, and said alcohols are about C6-C12.

10. The method of claim 6, wherein said optimized wax removal surfactant is left to soak said OPPE for a period of at least 2 hours.

11. The method of claim 6, wherein said optimized wax removal surfactant is circulated though said OPPE for a period of at least 2 hours.

12. The method of claim 6, said wax removal surfactant further comprising wax dispersants, wax solvents, wax crystal modifiers, or combinations thereof.

13. The method of claim 6, wherein said method is repeated at periodic intervals to keep wax deposits at a minimum.

14. The method of claim 6, wherein said OPPE is an oil well, and wherein said well is shut-in after said adding step c for a period of at least 12 hours.

15. The method of claim 14, wherein said well is opened after said period and an initial flow back is sent to a truck or tank for disposal or reuse until insignificant amounts of optimized wax removal surfactant are in said flow back, and thereafter said flow back is routed to a central processing facility ("CPF") for producing oil.

* * * * *